United States Patent
Morgan et al.

(10) Patent No.: US 12,342,884 B2
(45) Date of Patent: Jul. 1, 2025

(54) APPAREL WITH CLING REDUCTION FEATURES

(71) Applicant: NIKE, Inc., Beaverton, OR (US)

(72) Inventors: Daniel P. Morgan, Beaverton, OR (US); Kyle Schepke, Portland, OR (US); Joshua Patrick Williams, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 191 days.

(21) Appl. No.: 16/988,116

(22) Filed: Aug. 7, 2020

(65) Prior Publication Data

US 2021/0045477 A1    Feb. 18, 2021

Related U.S. Application Data

(60) Provisional application No. 62/972,426, filed on Feb. 10, 2020, provisional application No. 62/951,154, (Continued)

(51) Int. Cl.
*A41D 27/28* (2006.01)
*A41D 13/015* (2006.01)
(Continued)

(52) U.S. Cl.
CPC .......... *A41D 27/28* (2013.01); *A41D 13/0156* (2013.01); *A41D 31/02* (2013.01);
(Continued)

(58) Field of Classification Search
CPC .. B32B 3/085; B32B 5/26; B32B 7/05; B32B 37/0076; A41D 27/28; A41D 31/02;
(Continued)

(56) References Cited

U.S. PATENT DOCUMENTS 2,655,693 A  10/1953  Adams
3,300,557 A   1/1967  Luciano
(Continued)

FOREIGN PATENT DOCUMENTS

CN        2521924 Y   11/2002
CN      102613730 A    8/2012
(Continued)

OTHER PUBLICATIONS

Bixby adds third dimension to plastic sheet extrusions, Plastics, Available online at: <https://www.plastics.gl/extrusion-film/bixby-adds-third-dimension-to-plastic-sheet-extrusions/#:~:text=The%20company%20Bixby%20International%20has,profiles%20in%20their%20extruded%20sheet.>, 2019, 2 pages.
(Continued)

*Primary Examiner* — Matthew D Matzek
(74) *Attorney, Agent, or Firm* — Shook, Hardy & Bacon L.L.P.

(57) ABSTRACT

Aspects herein are directed to articles of apparel formed from a base textile and including a plurality of discrete overlay film structures affixed to the base textile at one or more locations on the article of apparel. When exposed to an external stimulus, the film structures undergo an increase in dimension in at least the z-direction and the base textile undergoes a change in dimension in at least the z-direction to produce stand-off nodes.

22 Claims, 10 Drawing Sheets

Related U.S. Application Data filed on Dec. 20, 2019, provisional application No. 62/924,527, filed on Oct. 22, 2019, provisional application No. 62/885,589, filed on Aug. 12, 2019.

(51) Int. Cl.

| | | |
|---|---|---|
| *A41D 31/02* | (2019.01) | |
| *A41D 31/12* | (2019.01) | |
| *A41D 31/18* | (2019.01) | |
| *B05C 5/02* | (2006.01) | |
| *B05C 11/00* | (2006.01) | |
| *B05D 1/26* | (2006.01) | |
| *B05D 1/28* | (2006.01) | |
| *B05D 7/14* | (2006.01) | |
| *B32B 3/08* | (2006.01) | |
| *B32B 5/26* | (2006.01) | |
| *B32B 7/05* | (2019.01) | |
| *B32B 37/00* | (2006.01) | |
| *D06B 1/02* | (2006.01) | |
| *B32B 3/26* | (2006.01) | |

(52) U.S. Cl.
CPC ......... *A41D 31/125* (2019.02); *A41D 31/185* (2019.02); *B05C 5/0208* (2013.01); *B05C 11/00* (2013.01); *B05D 1/265* (2013.01); *B05D 1/286* (2013.01); *B05D 7/14* (2013.01); *B32B 3/085* (2013.01); *B32B 5/26* (2013.01); *B32B 7/05* (2019.01); *B32B 37/0076* (2013.01); *D06B 1/02* (2013.01); *B32B 3/266* (2013.01); *B32B 2274/00* (2013.01); *B32B 2305/18* (2013.01); *B32B 2307/728* (2013.01); *B32B 2307/734* (2013.01); *Y10T 442/162* (2015.04); *Y10T 442/3854* (2015.04); *Y10T 442/40* (2015.04)

(58) Field of Classification Search
CPC ............... A41D 31/125; A41D 31/185; A41D 13/0156; A41D 13/002; A41D 13/0015; A41D 1/089; B05C 5/0208; B05C 11/00; B05D 1/265; B05D 1/286; B05D 7/14; D06B 1/02; Y10T 442/162; Y10T 442/3854; Y10T 442/40; A41H 43/00; D06M 15/507; D06M 15/693; D06M 23/14; D06M 23/16
USPC ................................ 2/69–157; 442/104, 286
See application file for complete search history.

(56) References Cited

U.S. PATENT DOCUMENTS

| | | | |
|---|---|---|---|
| 3,417,175 A | 12/1968 | Brown et al. | |
| 3,439,083 A | 4/1969 | Ugolini | |
| 3,791,906 A | 2/1974 | Farkas | |
| 4,415,623 A | 11/1983 | Schlaepfer | |
| 4,880,588 A | 11/1989 | Brault et al. | |
| 5,498,307 A | 3/1996 | Stevenson | |
| 5,937,272 A | 8/1999 | Tang | |
| 6,194,119 B1 | 2/2001 | Wolk et al. | |
| 6,296,732 B1 | 10/2001 | Enlow et al. | |
| 6,733,870 B2 | 5/2004 | Enlow et al. | |
| 6,767,807 B2 | 7/2004 | Shibata et al. | |
| 6,773,537 B2 | 8/2004 | Erickson et al. | |
| 6,809,045 B1 | 10/2004 | Alam et al. | |
| 8,039,373 B2 | 10/2011 | Fujinawa et al. | |
| 8,574,668 B2 | 11/2013 | Brown et al. | |
| 8,956,685 B2 | 2/2015 | Bogue et al. | |
| 9,732,454 B2 | 8/2017 | Davis et al. | |
| 10,170,341 B1 | 1/2019 | Lin et al. | |
| 2005/0252602 A1 | 11/2005 | Tateishi | |
| 2006/0260024 A1 | 11/2006 | Lee | |
| 2007/0016999 A1 | 1/2007 | Harber et al. | |
| 2007/0026265 A1 | 2/2007 | Sakurai et al. | |
| 2007/0042660 A1 | 2/2007 | Waxler | |
| 2007/0161305 A1* | 7/2007 | Wangbunyen | A41D 27/285 442/79 |
| 2007/0270067 A1 | 11/2007 | Yasui et al. | |
| 2007/0293106 A1 | 12/2007 | Harber | |
| 2008/0057809 A1* | 3/2008 | Rock | D06M 15/643 442/119 |
| 2008/0075850 A1 | 3/2008 | Rock | |
| 2008/0104738 A1* | 5/2008 | Conley | D01D 5/0084 2/82 |
| 2008/0254263 A1 | 10/2008 | Yasui et al. | |
| 2009/0276936 A1* | 11/2009 | Makida | D06M 15/53 428/196 |
| 2011/0296580 A1 | 12/2011 | Demarest et al. | |
| 2012/0282403 A1 | 11/2012 | Ray et al. | |
| 2014/0000004 A1* | 1/2014 | Baron | D04B 21/207 2/69 |
| 2014/0082815 A1 | 3/2014 | Harber et al. | |
| 2015/0246327 A1 | 9/2015 | Nichols et al. | |
| 2016/0242474 A1 | 8/2016 | Baschak et al. | |
| 2016/0338415 A1 | 11/2016 | Aihara | |
| 2016/0338435 A1 | 11/2016 | Aihara | |
| 2016/0340826 A1 | 11/2016 | Tibbits et al. | |
| 2017/0071275 A1 | 3/2017 | Darby | |
| 2017/0105466 A1* | 4/2017 | Baschak | A41D 27/28 |
| 2017/0144344 A1 | 5/2017 | Schmidt et al. | |
| 2017/0273377 A1 | 9/2017 | Aihara et al. | |
| 2017/0340037 A1 | 11/2017 | Bailey et al. | |
| 2018/0049698 A1 | 2/2018 | Berg et al. | |
| 2018/0142389 A1* | 5/2018 | Diaz | A41D 31/102 |
| 2018/0192720 A1 | 7/2018 | Blackford et al. | |
| 2018/0194106 A1 | 7/2018 | Tibbits et al. | |
| 2018/0195213 A1 | 7/2018 | Tibbits et al. | |
| 2018/0195216 A1 | 7/2018 | Lin | |
| 2020/0131695 A1 | 4/2020 | Lao et al. | |
| 2020/0215786 A1* | 7/2020 | Dorton | B32B 3/266 |
| 2021/0045474 A1 | 2/2021 | Koshkaroff et al. | |
| 2021/0045476 A1 | 2/2021 | Morgan et al. | |
| 2022/0030992 A1 | 2/2022 | Koshkaroff et al. | |
| 2022/0347717 A1 | 11/2022 | Janes et al. | |
| 2023/0157392 A1 | 5/2023 | Koshkaroff et al. | |

FOREIGN PATENT DOCUMENTS

| | | |
|---|---|---|
| CN | 103519427 A | 1/2014 |
| CN | 104859270 A | 8/2015 |
| CN | 106029234 A | 10/2016 |
| CN | 107750130 A | 3/2018 |
| CN | 108471823 A | 8/2018 |
| EP | 0360929 A1 | 4/1990 |
| EP | 0789543 B1 | 6/2002 |
| EP | 2411210 B1 | 7/2016 |
| EP | 3449743 A1 | 3/2019 |
| FR | 2856708 A1 | 12/2004 |
| GB | 2184399 B | 2/1990 |
| JP | 2000-195665 A | 7/2000 |
| JP | 2002-338908 A | 11/2002 |
| JP | 2003-322715 A | 11/2003 |
| KR | 10-2009-0102426 A | 9/2009 |
| TW | 201225160 A | 6/2012 |
| WO | 2009/041916 A1 | 4/2009 |
| WO | 2019/155348 A1 | 8/2019 |
| WO | 2019/169079 A1 | 9/2019 |
| WO | 2021/027837 A1 | 2/2021 |
| WO | 2021/096724 A1 | 5/2021 |

OTHER PUBLICATIONS

Non- Final Office Action received for U.S. Appl. No. 16/988,110, mailed on Apr. 11, 2022, 10 pages.
Production Processes, 8 pages.
Hardy, Norm, "What is Patterned Thin Film Deposition for Lift Off?", SEMICORE, Available online at: <http://www.semicore.com/news/73-thin-film-deposition-lift-off>, Sep. 16, 2013, 2 pages.

(56) References Cited

OTHER PUBLICATIONS

Yang, Lei, "Patterning Technique", ScienceDirect, Available online at: <https://www.sciencedirect.com/topics/engineering/patterning-method>, 2015, 22 pages.
International Search Report and Written Opinion received for PCT Patent Application No. PCT/CN2020/108643, mailed on Nov. 18, 2020, 9 pages.
International Search Report and Written Opinion received for PCT Patent Application No. PCT/US2020/045753, mailed on Oct. 29, 2020, 14 pages.
International Search Report and Written Opinion received for PCT Patent Application No. PCT/US2020/045755, mailed on Oct. 29, 2020, 13 pages.
International Search Report and Written Opinion received for PCT Patent Application No. PCT/US2020/045756, mailed on Oct. 29, 2020, 14 pages.
International Preliminary Report on Patentability received for PCT Patent Application No. PCT/CN2020/108643, mailed on Feb. 24, 2022, 5 pages.
International Preliminary Report on Patentability received for PCT Patent Application No. PCT/US2020/045753, mailed on Feb. 24, 2022, 9 pages.
International Preliminary Report on Patentability received for PCT Patent Application No. PCT/US2020/045755, mailed on Feb. 24, 2022, 8 pages.
International Preliminary Report on Patentability received for PCT Patent Application No. PCT/US2020/045756, mailed on Feb. 24, 2022, 9 pages.
Non-Final Office Action received for U.S. Appl. No. 16/988,093, mailed on Mar. 22, 2022, 8 pages.
Notice of Allowance received for U.S. Appl. No. 16/988,093, mailed on Sep. 21, 2022, 8 pages.
Final Office Action received for U.S. Appl. No. 16/988,110, mailed on Feb. 17, 2023, 17 pages.
International Search Report and Written Opinion received for PCT Patent Application No. PCT/US2022/046742, mailed on Jan. 26, 2023, 13 pages.
Non-Final Office Action received for U.S. Appl. No. 16/988,110, mailed on Jun. 7, 2023, 19 pages.
Non-Final Office Action received for U.S. Appl. No. 18/100,362, mailed on May 24, 2023, 12 pages.
Final office action received for U.S. Appl. No. 18/100,362, mailed on Dec. 13, 2023, 7 pages.
Intention to Grant received for European Application No. 20761444.7, mailed on Dec. 15, 2023, 6 pages.
Non-Final Office Action for U.S. Appl. No. 16/988,110, mailed on Jun. 7, 2023, 19 pages.
Office Action received for European Application No. 20761445.4, mailed on Dec. 14, 2023, 6 pages.
Office Action received for European Application No. 20761936.2, mailed on Dec. 13, 2023, 4 pages.
Extended European Search Report received for European Patent Application No. 20852126.0, mailed on Sep. 8, 2023, 9 pages.
Final Office Action received for U.S. Appl. No. 16/988,110, mailed on Sep. 21, 2023, 16 pages.
Non-Final Office Action received for U.S. Appl. No. 17/505,198, mailed on Apr. 22, 2024, 18 pages.
Notice of Allowance received for U.S. Appl. No. 18/100,362, mailed on Apr. 4, 2024, 8 pages.
Office Action received for European Application No. 20852126.0, mailed on Jul. 22, 2024, 5 pages.
Extended European Search Report received for European Application No. 24177068.4, mailed on Oct. 18, 2024, 8 pages.
Notice of Allowance received for U.S. Appl. No. 17/505,198, mailed on Aug. 14, 2024. 9 pages.
Notice of Allowance received for U.S. Appl. No. 18/100,362, mailed on Jun. 20, 2024, 2 pages.

* cited by examiner

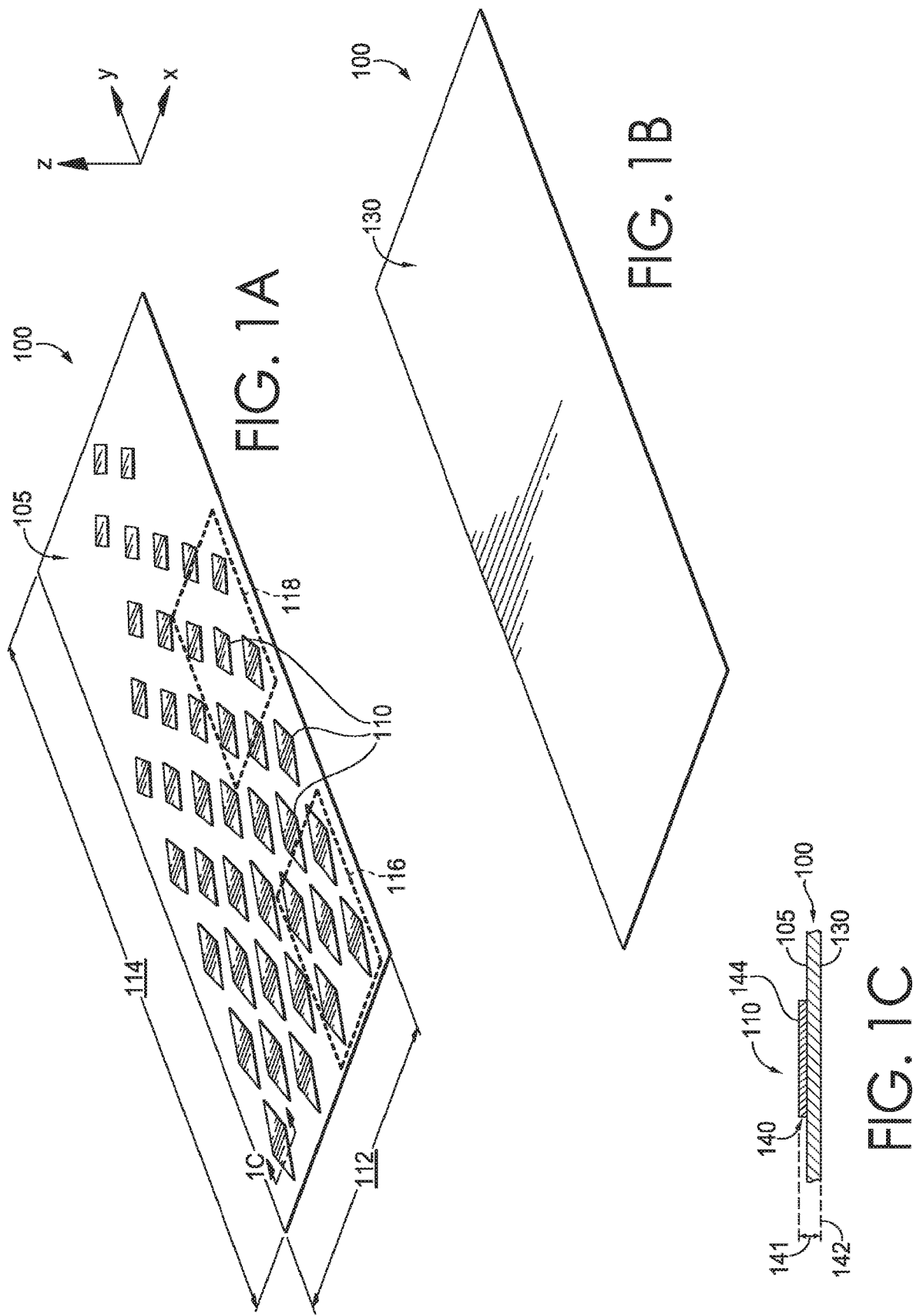

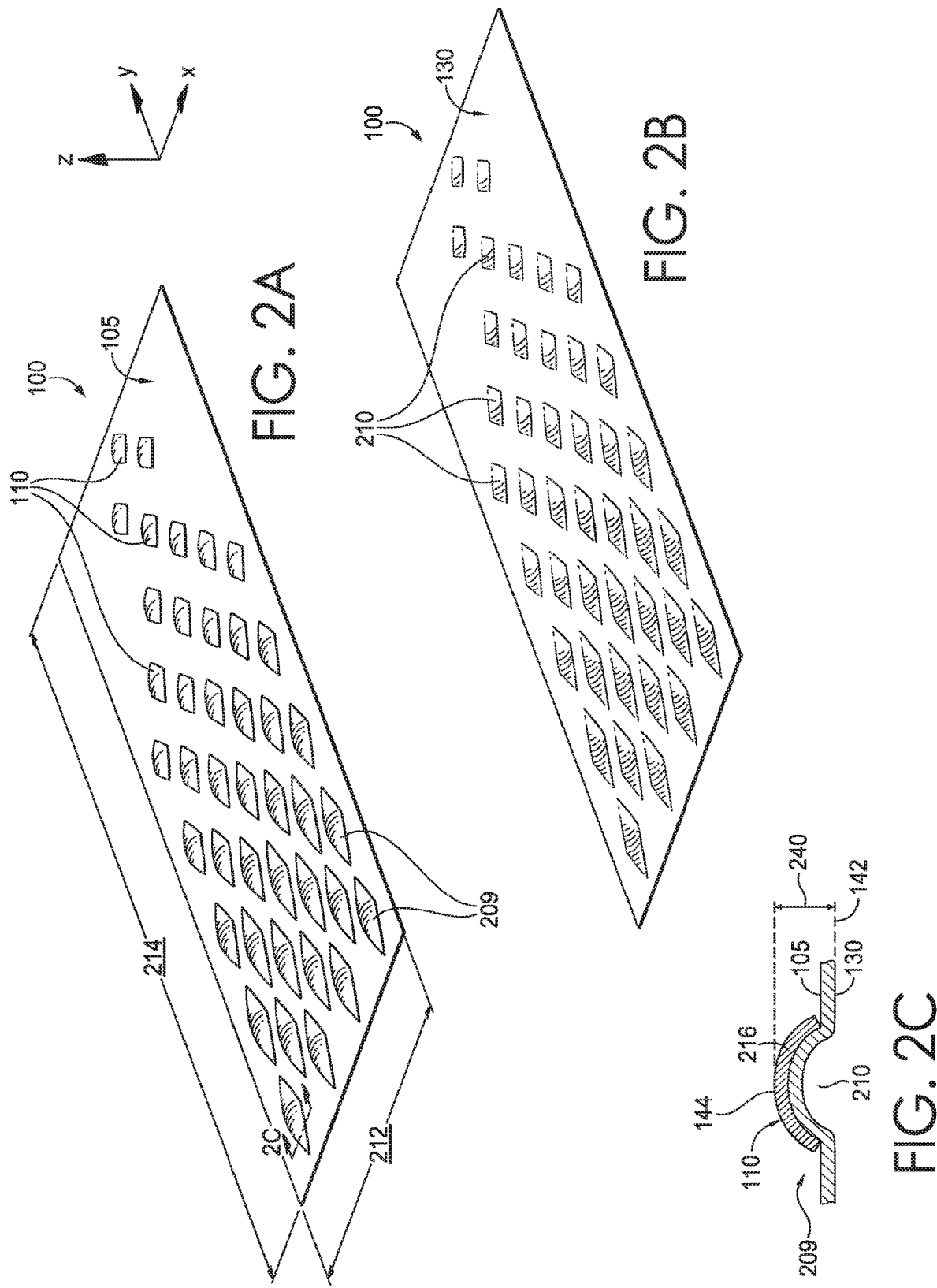

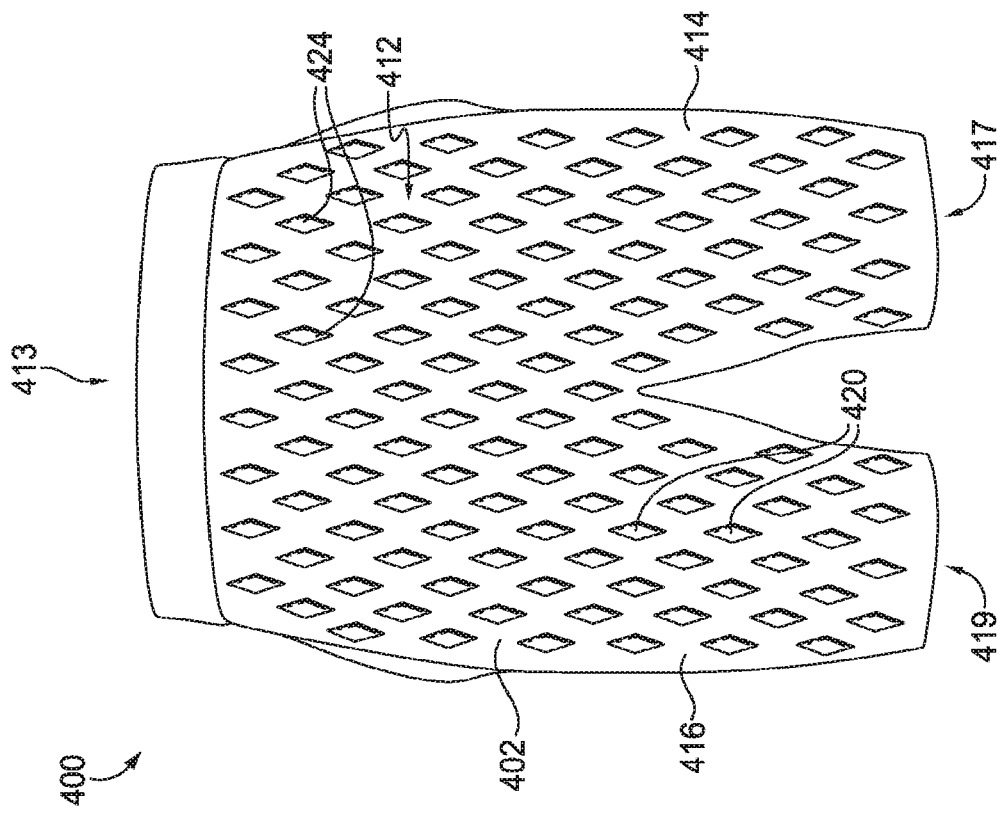
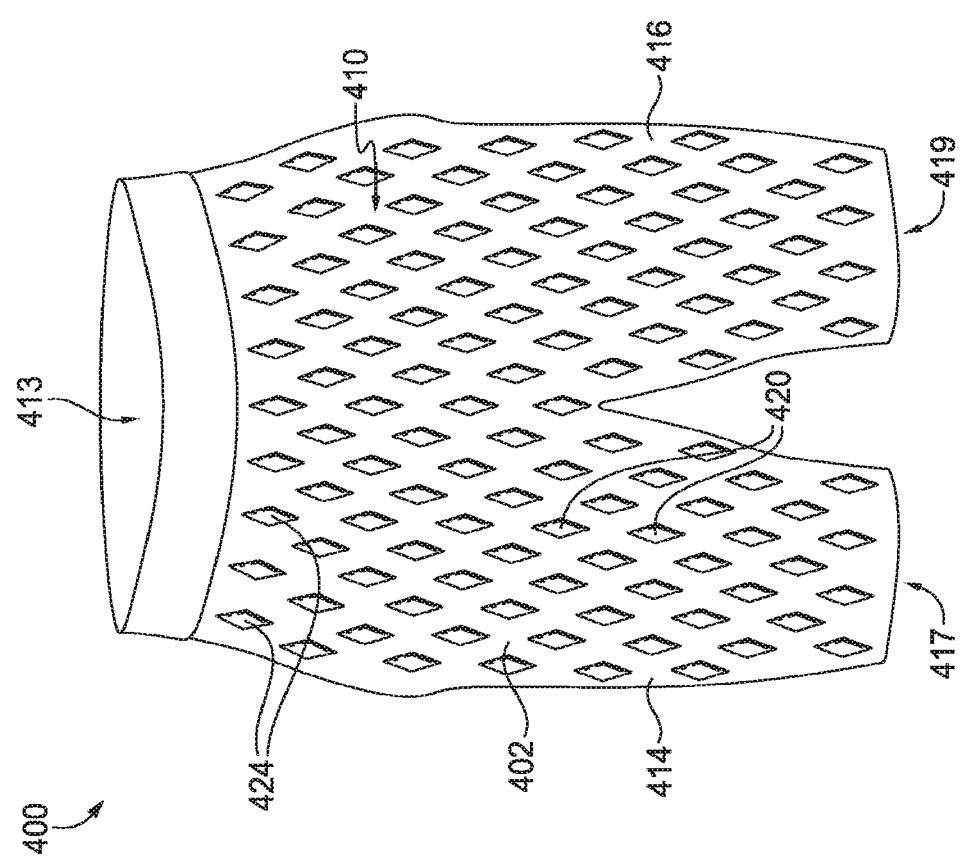

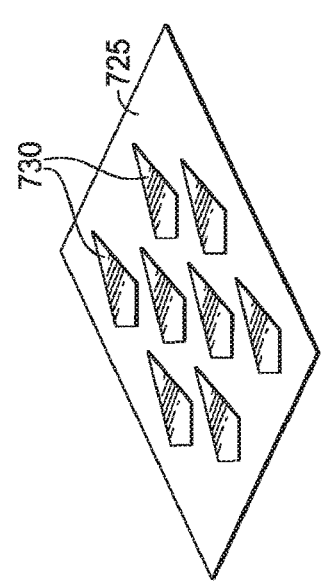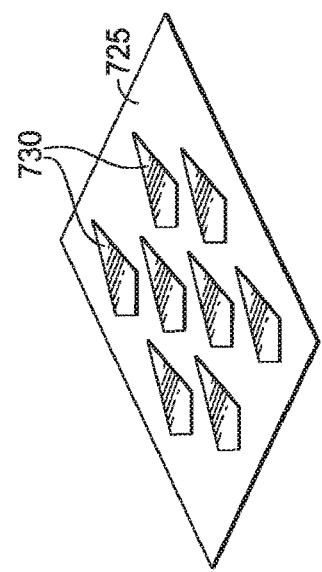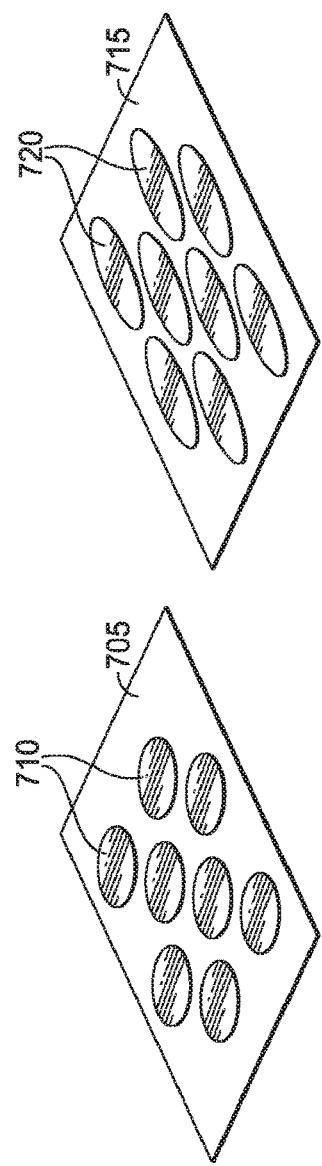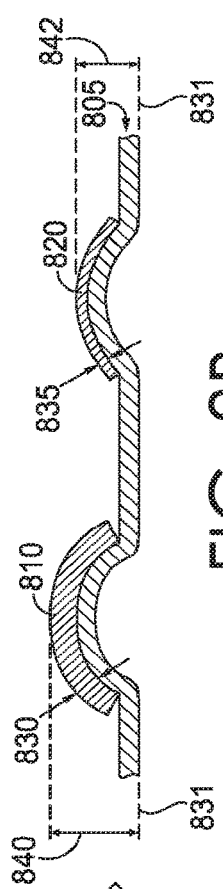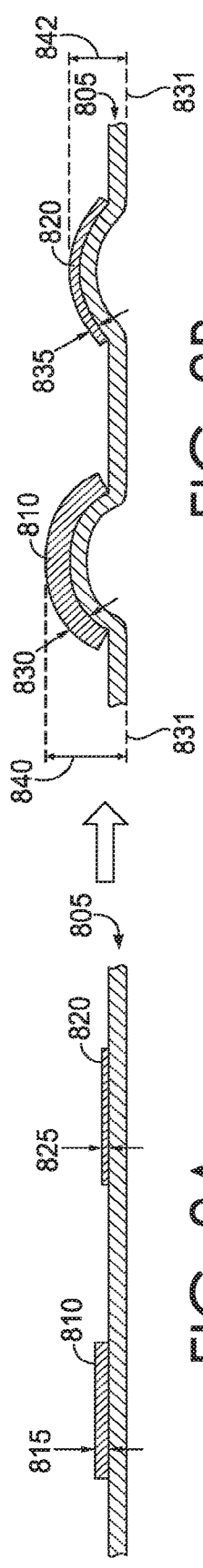

900 —

910 — AFFIX DISCRETE OVERLAY FILM STRUCTURES TO AN INNER-FACING SURFACE AND/OR AN OUTER-FACING SURFACE OF A BASE TEXTILE THAT FORMS A GARMENT IN AREAS CORRESPONDING TO HIGH SWEAT PRODUCTION REGIONS OF A HUMAN BODY WHEN THE GARMENT IS WORN

APPAREL WITH CLING REDUCTION FEATURES

CROSS-REFERENCE TO RELATED APPLICATIONS

This application, entitled "Apparel with Cling Reduction Features," claims the benefit of priority of U.S. Provisional App. No. 62/972,426, filed Feb. 10, 2020, and entitled "Apparel with Cling Reduction Features," U.S. Provisional App. No. 62/885,589, filed Aug. 12, 2019, and entitled "Apparel with Adaptive Fit," U.S. Provisional App. No. 62/924,527, filed Oct. 22, 2019, and entitled "Apparel with Dynamic Vent Structure," and U.S. Provisional App. No. 62/951,154, filed Dec. 20, 2019, and entitled "Methods, Systems, and Articles for Producing a Film Pattern on a Substrate Material." The entireties of the aforementioned applications are incorporated by reference herein.

TECHNICAL FIELD

Aspects herein are directed to an article of apparel that utilizes discrete overlay film structures that are responsive to an external stimulus to provide stand-off and reduce cling between the article of apparel and a wearer's body surface.

BACKGROUND

Traditional articles of apparel, especially lightweight garments, tend to cling to a wearer's body surface in high sweat areas which may be uncomfortable and/or distracting to the wearer.

BRIEF DESCRIPTION OF THE DRAWINGS

Examples of aspects herein are described in detail below with reference to the attached drawing figures, wherein:

FIG. 1A illustrates a perspective view of a first surface of an example textile having a plurality of discrete overlay film structures before the textile is exposed to an external stimulus in accordance with aspects herein;

FIG. 1B illustrates a perspective view of a second opposite surface of the textile of FIG. 1A in accordance with aspects herein;

FIG. 1C illustrates a cross-sectional view of the textile of FIG. 1A taken along cut line 1C-1C in accordance with aspects herein;

FIG. 2A illustrates a perspective view of the first surface of the textile of FIG. 1A after the textile is exposed to the external stimulus in accordance with aspects herein;

FIG. 2B illustrates a perspective view of the second opposite surface of the textile of FIG. 2A in accordance with aspects herein;

FIG. 2C illustrates a cross-sectional view of the textile of FIG. 2A taken along cut line 2C-2C in accordance with aspects herein;

FIGS. 4C-4D illustrate a front view and a back view respectively of the inner-facing surface of the lower-body garment of FIGS. 4A-4B after the lower-body garment is exposed to the external stimulus in accordance with aspects herein;

FIGS. 7A-7C illustrate different shape configurations for the overlay film structures in accordance with aspects herein;

FIG. 8A illustrates a side view of an example textile having overlay film structures with different thicknesses before the textile is exposed to an external stimulus in accordance with aspects herein;

FIG. 8B illustrates a side view of the textile of FIG. 8A after the textile is exposed to the external stimulus in accordance with aspects herein; and FIG. 9 illustrates a flow diagram of an example method of manufacturing a garment that includes discrete overlay film structures in accordance with aspects herein.

DETAILED DESCRIPTION

Figure 3B:
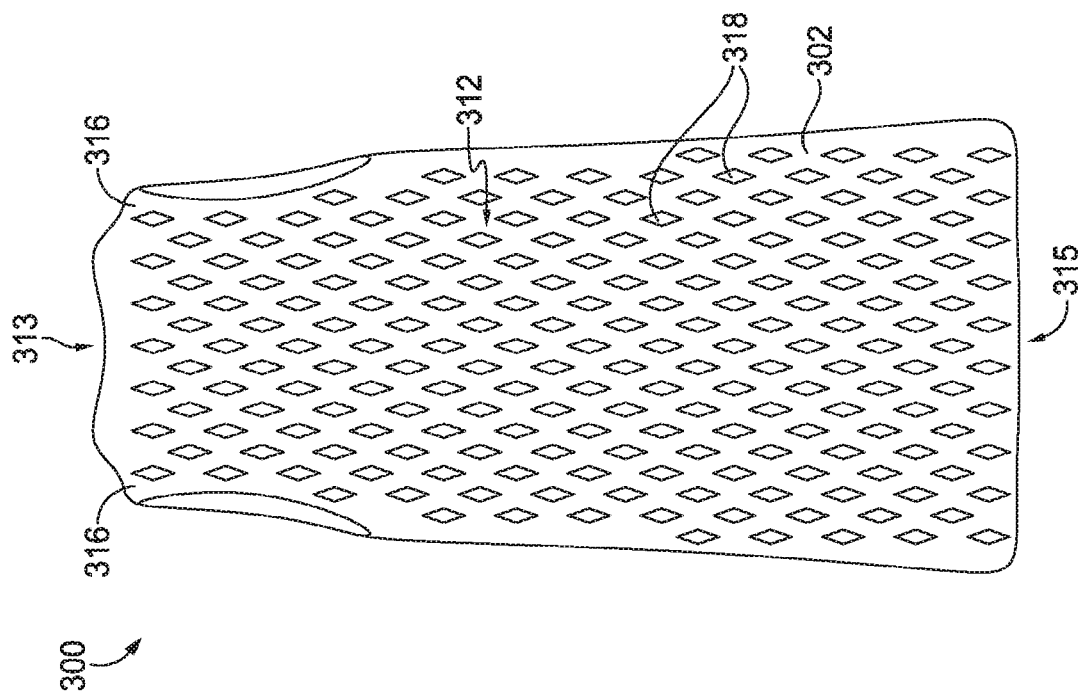
FIGS. 3A-3B illustrate a front view and a back view respectively of an inner-facing surface of an example upper-body garment having a plurality of discrete overlay film structures before the upper-body garment is exposed to an external stimulus in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional articles of apparel, especially lightweight garments, tend to cling to a wearer's body surface in high sweat areas which may be uncomfortable and/or distracting to the wearer. Aspects herein provide for garments, such as an upper-body garment or a lower-body garment formed from a lightweight base textile and having one or more overlay film structures affixed to the base textile that change in dimension in at least a z-direction in response to an external stimulus such as moisture. The change in dimension in the z-direction of the overlay film structures causes the base textile to also undergo a change in dimension in the z-direction. The result is the formation of stand-off nodes that, for example, help to "lift" or space apart the garment from a wearer's body surface which may reduce the degree of cling of the garment to the wearer especially in high sweat production areas. As well, the stand-off nodes help to create a space between an inner-facing surface of the garment and the wearer's skin through which air may circulate and help cool the wearer and evaporate sweat or perspiration produced by the wearer.

In example aspects, the change in dimension of the overlay film structures may also cause the base textile to decrease in width in the x-direction and/or decrease in length in the y-direction due to the base textile "puckering" or being tensioned in the z-direction in areas underlying the overlay film structures. The decrease in width and/or length of the base textile may also cause a change in the level of fit of a garment. For example, when the film structures are applied circumferentially around a torso portion of an upper-body garment and the upper-body garment is exposed to a stimulus such as sweat, the circumference of the torso portion may decrease due to the cumulative effect of the puckering of the base textile. This may be advantageous when a tighter fit is desired to reduce drag such as in running.

In one illustrative example, the film structures may be applied to a lightweight garment such as, for example, a racing tank top. When the wearer engages in athletic activities and begins to sweat, the stand-off nodes may form due to the change in dimension in the z-direction of the film structures and the base textile. Wearer comfort may be improved due to less cling and increased air circulation within the top. Additionally, a circumference of the torso portion of the tank top may decrease which, in turn, may create a more aerodynamic profile. When the wearer stops exercising and sweat production ceases, the overlay film structures and the garment transition back to their pre-exposure state which may provide needed warmth to the wearer as well as a desired aesthetic in the post-exercise period.

As used herein, the term "article of apparel" encompasses any number of products meant to be worn by a wearer including upper-body garments (e.g., shirts, jackets, hoodies, tank tops, pullovers), lower-body garments (e.g., pants, shorts, leggings), articles of footwear such as shoes or socks, articles of headwear (e.g., hats), gloves, sleeves (e.g., arm sleeves, calf sleeves), and the like. Positional terms used when describing the article of apparel such as front, back, inner-facing surface, outer-facing surface, and the like are with respect to the article of apparel being worn as intended with the wearer standing upright. As such, when the article of apparel is in the form of an upper-body garment, the front of the upper-body garment is configured to cover, for instance, a front upper torso area and a front arm area (when the garment has sleeves), and the back of the upper-body garment is configured to cover a back upper torso area and a back arm area (when the garment has sleeves). When the article of apparel is in the form of a lower-body garment, the front of the lower-body garment is configured to cover, for instance, a front lower torso area and a front leg area of the wearer, and the back of the lower-body garment is configured to cover a back lower torso area and a back leg area. Similarly, the inner-facing surface of the article of apparel is configured to be in face-sharing contact (defined as a surface of a first material that is in contact or near contact with a surface of a second material) with a wearer's skin surface or a base layer, and the outer-facing surface of the article of apparel is configured to face toward the external environment or away from the inner-facing surface of the article of apparel.

The term "x-direction" when referring to, for instance, an upper-body garment means a direction extending along the horizontal width of the upper-body garment from one sleeve to the opposite sleeve. When referring to lower-body garments, the x-direction extends from one leg portion to the opposite leg portion. The term "y-direction" when referring to an upper-body garment means a direction extending along the vertical length of the upper-body garment from a neck opening to a waist opening. When referring to lower-body garments, the y-direction extends from a waist opening to a leg opening. The term "z-direction" means a direction that extends away from the surface of the upper- or lower-body garments in a positive or negative direction and that is orthogonal to the x- and y-directions.

The term "external stimulus" as used herein encompasses any number of stimuli such as temperature, pressure, moisture, electrical energy, magnetic energy, light, sound, and the like. In one example aspect, the external stimulus is moisture where the moisture can be in the form of liquid water, water vapor, perspiration, and the like.

The term "base textile" as used herein means any material or fabric that is used to form, at least in part, an article of apparel. In example aspects, the change in dimension or degree of movement of the base textile in the z-direction may be dependent on a number of factors associated with the base textile. For example, the degree of movement of the base textile in the z-direction may be dependent on the moisture regain value of the yarn(s) used to form the base textile where moisture regain is defined as the percentage of moisture an oven-dry fiber or filament will absorb from the air when at standard temperature and relative humidity. As an example, when the base textile is formed from yarns having a low moisture regain, such as polyester or nylon, the base textile may undergo a greater degree of deformation or puckering compared to when the base textile is formed from yarns having a high moisture regain, such as cotton. This is because yarns having a high moisture regain will typically absorb moisture causing the yarn to swell or expand which counteracts the tensioning forces generated by the swelling of the overlay film structures and results in a lesser degree of puckering of the base textile.

Another factor that influences the degree of movement of the base textile in the z-direction is its weight. In aspects, the base textile contemplated herein may comprise a lightweight fabric (e.g., from about 30 grams per square meter (gsm) to about 150 gsm) or an ultra-lightweight fabric (e.g., from about 10 gsm to about 100 gsm). Aspects herein contemplate that the base textile has a weight not exceeding about 150 gsm. The term "about" as used herein means within ±10% of a referenced value. Lightweight and ultra-lightweight fabric may change dimension in the z-direction to a greater degree than heavier weight fabrics. In further example aspects, the degree of movement of the base textile in the z-direction may be dependent on the presence of elastomeric yarns that exhibit stretch and recovery properties such as, for example, spandex (known by the trade name LYCRA®), elastane, and the like. When, for example, textile types, textile weights, and textile constructions (e.g., knit or woven) are the same, base textiles that include elastomeric yarns may exhibit a greater degree of movement in the z-direction than textiles that do not include elastomeric yarns. Thus, the degree of movement of the base textile in the z-direction may be adjusted based on the type of yarn used to form the base textile, the weight of the base textile, and/or the use of elastomeric yarns in the base textile.

The term "discrete overlay film structure" as used herein refers to a film application on the base textile where each film structure is spaced apart from (i.e., discrete from) an adjacent film structure by an expanse or portion of the base textile. Stated differently, each overlay film structures is circumscribed by the base textile. In example aspects, the film structures may be applied to the base textile by directly bonding the film structures to the base textile using, for example, heat. As well, the film structures may be applied to the base textile using an intermediate adhesive layer that fully adheres the film to the base textile. Aspects herein contemplate that the film may comprise any film that expands in one or more of the x-direction, the y-direction, and/or the z-direction when exposed to an external stimulus such as moisture while remaining affixed or adhered to the base textile. In an example aspect, the film may comprise a thermoplastic polyester elastomer (TPEE), and more specifically a poly-butylene terephthalate based (PBT-based) TPEE film that is configured to transport or diffuse moisture from one surface of the film to a second opposite surface of the film. The transport of the moisture may be facilitated by the presence of hydrophilic molecules (molecules that attract or have an affinity for water) within the film where a greater number of hydrophilic molecules may result in a greater transport of moisture. The movement of moisture through the film may be measured using a water vapor transmission test such as ASTM E96 B, and in example aspects, the water vapor transmission rate of the film may be from about 600 $g/m^2/day$ to about 10,000 $g/m^2/day$, from about 1,000 $g/m^2/day$ to about 9,000 $g/m^2/day$, from about 3,000 $g/m^2/day$ to about 8,000 $g/m^2/day$, from about 5,000 $g/m^2/day$ to about 7,000 $g/m^2/day$, or about 6,000 $g/m^2/day$. An example PBT-based TPEE film is TPEE48 manufactured by Far Eastern New Century Corporation in Taipei, Taiwan. Additional film materials contemplated herein include a thermoplastic polyurethane (TPU) film material or variants thereof, a thermoplastic poly(ether-amide) elastomer (TPAE) film material, and/or any film material capable of transporting or diffusing moisture from one surface of the film material to a second opposite surface of the film material.

The amount of movement of the underlying base textile in the z-direction caused by the film structures may be dependent on the thickness of the film structures and on the surface area of the film structures. Aspects herein contemplate the film structures having a thickness not exceeding, for example, about 50 microns. In general, a thicker film structure will cause more movement of the base textile in the z-direction than a thinner film structure dependent on the film structure's thickness being such that moisture is able to diffuse through the film structure within a reasonable time frame. Additionally, a film structure with a greater surface area will cause more deformation of the base textile than a film structure with a smaller surface area.

Unless otherwise noted, all measurements provided herein are measured at standard ambient temperature and pressure (25 degrees Celsius or 298.15 K and 1 bar).

FIG. 1 illustrates a perspective view of a first surface 105 of a base textile 100 used to form an article of apparel before the base textile 100 is exposed to an external stimulus. The first surface 105 may form an outer-facing surface of the article of apparel or an inner-facing surface of the article of apparel. The base textile 100 has a width 112 in the x-direction and a length 114 in the y-direction. The base textile 100 includes a plurality of discrete overlay film structures 110. The discrete overlay film structures 110 have a generally diamond shape although the shape and the orientation of the discrete overlay film structures 110 are illustrative only, and other shapes and orientations are contemplated herein. In example aspects, the overlay film structures may have a surface area from about 25 $mm^2$ to about 4900 $mm^2$, from about 100 $mm^2$ to about 4000 $mm^2$, from about 500 $mm^2$ to about 3000 $mm^2$, or from about 1000 $mm^2$ to about 2000 $mm^2$. Using multiple, discrete overlay film structures as opposed to a continuous film allows for more exposure of the base textile 100 which can provide functional advantages based on the characteristics of the base textile 100 such as moisture wicking, better feel, permeability, breathability, and the like. Also, use of discrete overlay film structures as opposed to a continuous film allows for fine-tuning of where stand-off of the base textile 100 is desired.

The discrete overlay film structures 110 are shown as being applied in a gradient pattern with a greater concentration of the overlay film structures 110 in a first location 116 of the base textile 100 compared to a second location 118 of the base textile. The difference in concentration may be due to, for instance, a decrease in the number of film structures 110 per unit area and/or a change in the size or surface area of the individual film structures 110 per unit area (both shown in FIG. 1A). Applying the film structures 110 in a gradient pattern allows for a customization of the degree of deformation of the base textile 100 when the base textile 100 is exposed to an external stimulus. For instance, a greater amount of stand-off may be achieved in the first location 116 compared to the second location 118.

When the base textile 100 is incorporated into, for example, an article of apparel the first location 116 may be positioned adjacent to areas of the wearer that experience high amounts of sweat production based on, for example, sweat maps of the human body. In example aspects, sweat maps indicate that wearers experience relatively greater amounts of sweating along the central back torso area (both upper torso and lower torso), the underarm area, the head area, a flank area (i.e., the sides of a person between the person's ribs and hips), a central upper front torso area, and a shoulder area. Thus, when the article of apparel is an upper-body garment, the first location 116 may be positioned adjacent to a central upper back torso area of a wearer, a flank area of the wearer, a shoulder area of the wearer, a central upper front torso area of the wearer, an underarm area of the wearer, and/or a head of the wearer. When the article of apparel is a lower-body garment, the first location 116 may be positioned adjacent to a lower back torso area and/or a flank area of a wearer. Although shown as being applied in a gradient pattern, it is contemplated herein that the plurality of discrete overlay film structures 110 may be uniformly applied to the first surface 105 of the base textile 100.

FIG. 1B is a perspective view of a second opposite surface 130 of the base textile 100 before the base textile 100 is exposed to the external stimulus. As shown, the second surface 130 is generally planar or smooth. In example aspects, the second surface 130 may not include any film structures 110 although it is contemplated herein that film structures 110 may additionally or alternatively be applied to the second surface 130 of the base textile 100.

FIG. 1C is a cross-sectional view of the base textile 100 in the x-direction (cut line 1C-1C of FIG. 1A. The film structures 110 have a thickness 140 before being exposed to an external stimulus. As shown, the first surface 105 and the second surface 130 of the base textile 100 and the overlay film structure 110 are planar and without deformation. In example aspects, the base textile and the overlay film structure 110 have a combined height 141 as measured between a second surface plane 142 defined by the second surface 130 and an exposed surface 144 of the overlay film structure 110.

FIG. 2A is a perspective view of the first surface 105 of the base textile 100 after the base textile 100 is exposed to an external stimulus. Upon exposure to the external stimulus, the film structures 110 swell and/or increase in dimension primarily in, for example, the positive z-direction but may also increase in dimension in the positive and/or negative x-direction and/or the positive and/or negative y-direction (i.e., the film structures 110 omni-directionally expand). When the external stimulus is moisture (e.g., sweat), and the film structures 110 are formed from the film materials described above, the swelling of the film structures 110 may be due to the water molecules diffusing through the film. Because the film structures 110 are adhered to the base textile 100, as the film structures 110 increase in dimension, the film structures 110 may "lift" the base textile 100 in the areas underlying the film structures 110 or cause the base textile 100 to move in the positive z-direction in the areas underlying the film structures 110. The result is that stand-off nodes (referenced generally by the numeral 209) are formed on the first surface 105 of the base textile 100. On the second surface 130 of the base textile 100, the base textile 100 "puckers" to form debossed regions 210 that extend concavely away from the second surface plane 142 of the base textile 100 and toward the first surface 105. This aspect is shown in FIG. 2B which is a depiction of the second surface 130 of the base textile 100 after the base textile 100 has been exposed to the external stimulus.

FIG. 2C is a cross-sectional view of the base textile 100 in the x-direction of the base textile 100 (cut line 2C-2C of FIG. 2A). As shown in FIG. 2C, after exposure to the external stimulus, the film structures 110 undergo a growth in the positive z-direction based on the swelling of the film structures 110 causing them to increase to a thickness 216 where the thickness 216 is greater than the thickness 140. FIG. 2C further depicts the film structures 110 folding or bending along, for example, a midline axis, causing the underlying base textile 100 to pucker or deform in the positive z-direction thus creating the debossed region 210. After exposure to the external stimulus, the overlay film structure 110 and the base textile 100 in areas underlying the overly film structure 110 are no longer planar. After exposure to the external stimulus, the base textile 100 and the overlay film structure 110 have a combined height of 240 as measured between the second surface plane 142 and an apex of the exposed surface 144 of the overlay film structure 110. The combined height 240 creates the stand-off nodes 209. The height 240 is greater than the height 141 and may be from about 0.25 mm to about 50 mm, from about 10 mm to about 40 mm, or from about 20 mm to about 30 mm.

When the film structures 110 are no longer exposed to, for example, moisture, the film structures 110 undergo a decrease in swelling due to a reduction or cessation of water molecules moving through the film structures 110. The film structures 110 return to their pre-exposure, planar state, the debossed regions 210 relax, and the base textile 100 reverts to its pre-exposure planar state. Thus, use of the film structures 110 enables a reversible formation of the stand-off nodes 209.

Figure 3A:
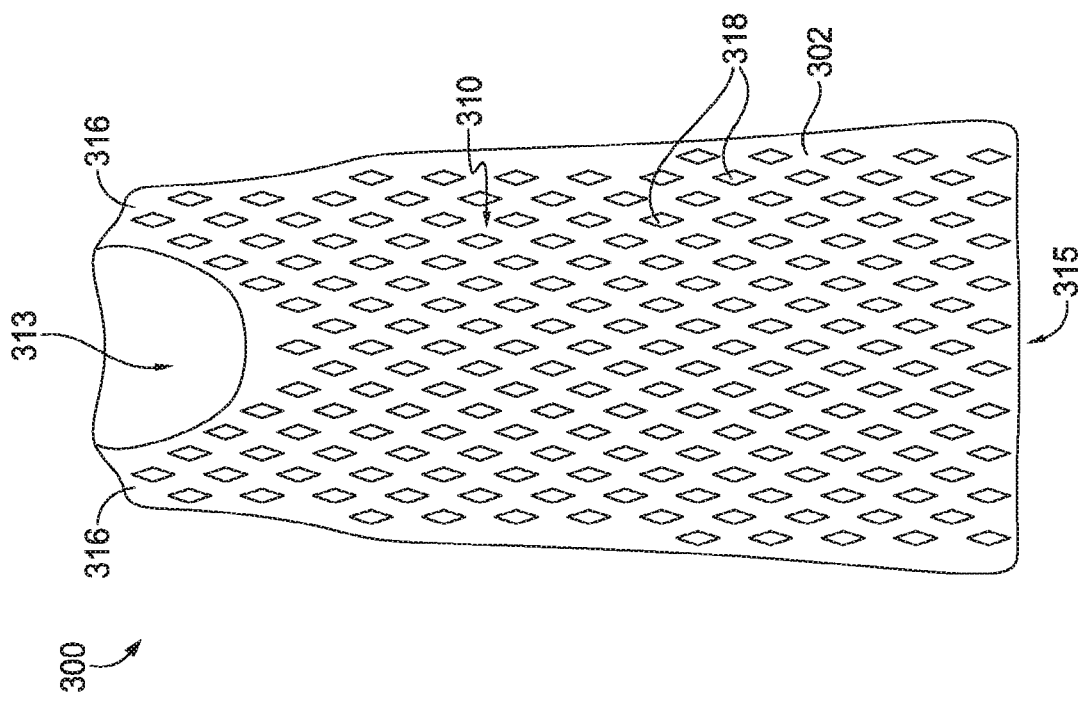

FIGS. 3A and 3B depict front and back views respectively of an inner-facing surface of an upper-body garment 300 before the upper-body garment 300 is exposed to an external stimulus. The upper-body garment 300 is shown as a sleeveless shirt (e.g., a tank top) and, in one example aspect, may be in the form of a racing tank top formed from a lightweight, knit material. Other configurations are contemplated herein such as a top with sleeves, a jacket, a vest, and the like. As well, other constructions are contemplated herein including woven constructions and nonwoven constructions. The upper-body garment 300 is formed from a base textile 302 and includes a front torso area 310 (shown in FIG. 3A) and a back torso area 312 (shown in FIG. 3B) that define a neck opening 313 and a waist opening 315; the front torso area 310 and the back torso area 312 form a torso portion of the upper-body garment 300. The upper-body garment 300 also includes a pair of shoulder areas 316.

The upper-body garment 300 further includes a plurality of discrete overlay film structures 318 affixed to the inner-facing surface of the upper-body garment 300. Aspects herein further contemplate the overlay film structures 318 alternatively or additionally being affixed to an outer-facing surface of the upper-body garment 300. The discrete overlay film structures 318 are shown applied uniformly over the front torso area 310, the back torso area 312, and the pair of shoulder areas 316 of the upper-body garment 300. It is also contemplated herein that the plurality of discrete overlay film structures 318 may be zonally located as explained further below. In example aspects, it is contemplated herein that the overlay film structures 318 cover from about 20% to about 70% of the surface area of the upper-body garment 300, from about 30% to about 60% of the surface area of the upper-body garment 300, or from about 35% to 40% of the surface area of the upper-body garment 300. Coverage in these ranges provides for an adequate amount of stand-off to achieve a measurable reduction in cling while still maintaining characteristics of the base textile 302 such as breathability, permeability, moisture-wicking, hand, and the like. The number, size, orientation, and shape of the film structures 318 are illustrative, and other sizes, orientations, shapes and number of the film structures 318 are contemplated herein.

As shown in FIGS. 3A and 3B, in example aspects, the upper-body garment 300 may not be closely adherent to the wearer's torso to provide a looser fit. This may be desirable in some situations, but in other situations, the wearer may desire a closer fit in this area to, for example, reduce drag.

Figure 3D:
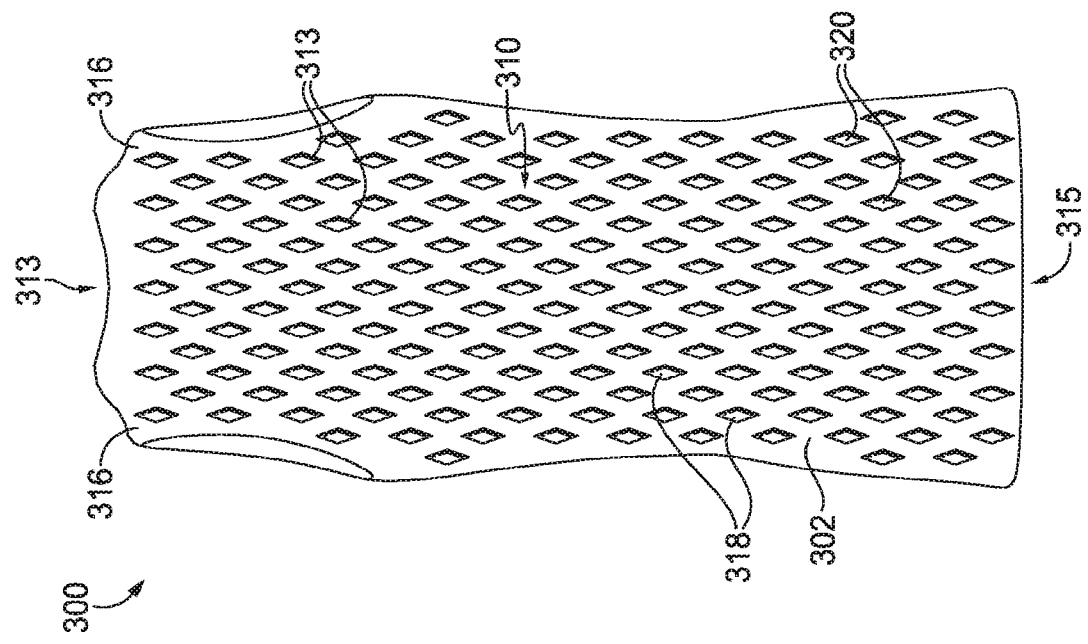
FIGS. 3C-3D illustrate a front view and a back view respectively of the inner-facing surface of the upper-body garment of FIGS. 3A-3B after the upper-body garment is exposed to the external stimulus in accordance with aspects herein.
Figure 3C:
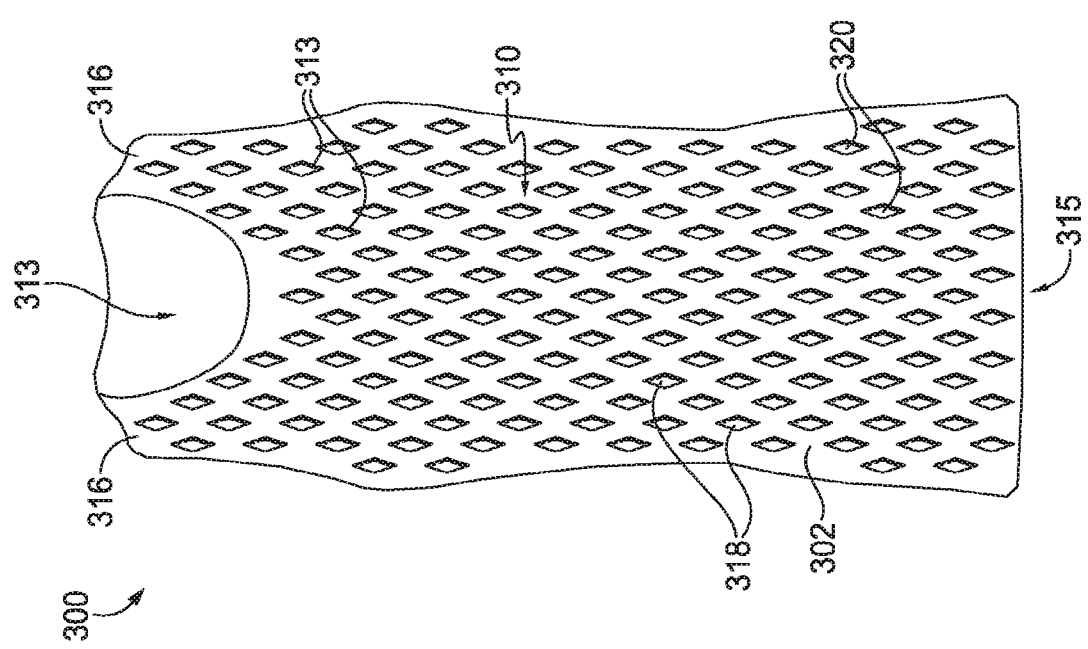

FIGS. 3C and 3D depict front and back views respectively of the upper-body garment 300 after the garment 300 has been exposed to a stimulus such as sweat. As explained with respect to the base textile 100, exposure of the film structures 318 to the stimulus causes the film structures 318 to expand, for instance, at least in a z-direction and/or in the x-direction and the y-direction, and to fold or bend at least along their midline axes. The folding or bending of the film structures 318 along their midline axes causes the base textile 302 to pucker or move in the z-direction in areas of the base textile 302 that underlie the film structures 318 creating stand-off nodes 320. Since the overlay film structures 318 are positioned on an inner-facing surface of the upper-body garment 300, the stand-off nodes 320 extend toward a body surface of a wearer helping to lift the upper-body garment 300 off of the wearer's skin surface to reduce cling and create a space between the inner-facing surface of the upper-body garment 300 and the wearer's skin surface through which air can circulate and aid in the evaporation of sweat.

Further, in example aspects, due to the film structures 318 being applied circumferentially around the torso portion of the upper-body garment 300, the cumulative puckering of the base textile 302 may cause the circumference of the torso portion to decrease. For instance, after exposure to the external stimulus, the waist opening 315 may have a circumference less than the circumference of the waist opening 315 prior to the upper-body garment 300 being exposed to the stimulus as shown in FIGS. 3C and 3D. The decrease in circumference of the torso portion may create a tighter, more aerodynamic fit of the upper-body garment 300. When the upper-body garment 300 is no longer exposed to the external stimulus, the film structures 318 transition back to a flattened or planar state, the deformation of the base textile 302 relaxes, and the stand-off nodes 320 disappear.

Figure 3E:
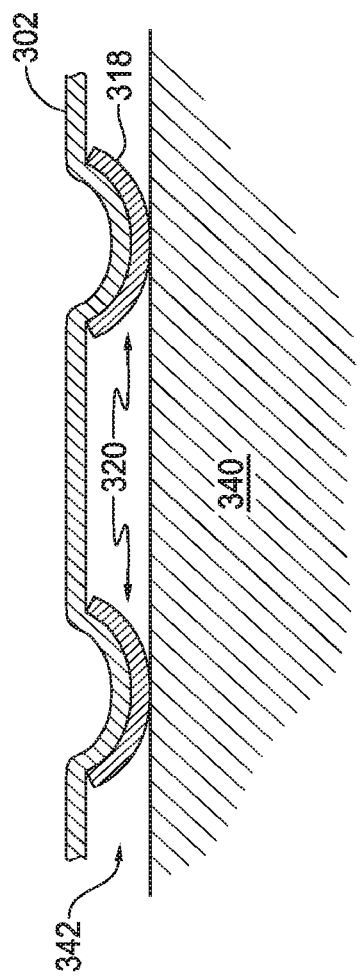
FIG. 3E illustrates an example cross-section view of a base textile having stand-off nodes projecting toward a body surface of a wearer in accordance with aspects herein.

FIG. 3E is an example cross-section of a portion of the upper-body garment 300 after the upper-body garment 300 has been exposed to a stimulus such as sweat. As shown, the stand-off nodes 320 are formed by at least the movement of the base textile 302 in the z-direction. In example aspects, the stand-off nodes 320 project toward a wearer's body surface 340, and an apex of the stand-off nodes 320 may be in contact or near contact with the wearer's body surface 340 helping to lift the base textile 302 off of the wearer's body surface 340. Additionally, the stand-off nodes 320 create a space 342 between the planar portions of the base textile 302 and the wearer's body surface 340 through which air can circulate and help cool the wearer and facilitate the evaporation of sweat.

Figure 3F:
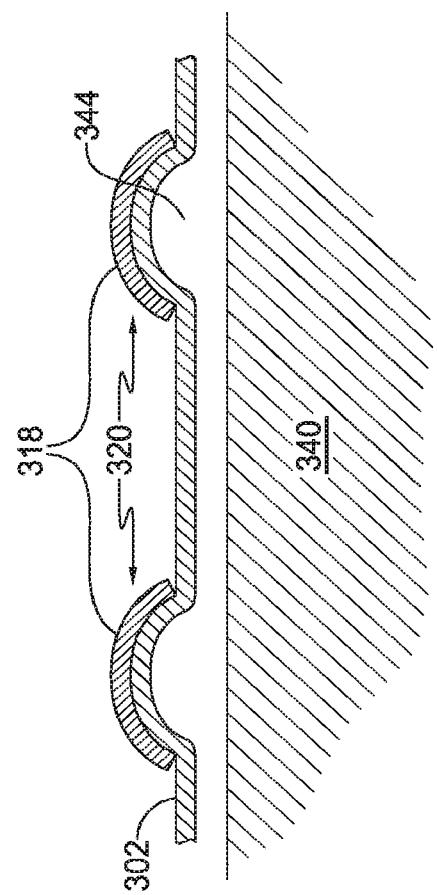
FIG. 3F illustrates an example cross-section view of a base textile having stand-off nodes projecting away from a body surface of a wearer in accordance with aspects herein.

FIG. 3F is an example cross-section illustrating the base textile 302 with the overlay film structures 318 applied to an outer-facing surface of the base textile 302. As shown in FIG. 3E, upon exposure to a stimulus, the stand-off nodes 320 project away from the wearer's body surface 340 forming spaces 344 between the non-planar portions of the base textile 302 and the wearer's body surface 340. The spaces 344 reduce the overall contact area of the base textile 302 with the wearer's body surface 340 thereby reducing the amount of cling and may also allow for a degree of air circulation to help cool the wearer and facilitate the evaporation of sweat. For illustrative purposes the base textile 302 is shown as spaced apart from the wearer's body surface 340 in FIG. 3F but it is contemplated herein that the base textile 302 may be in contact with the wearer's body surface 340 except for the spaces 344. Any and all aspects, and any variation thereof, are contemplated as being within aspects herein.

Figure 4A:
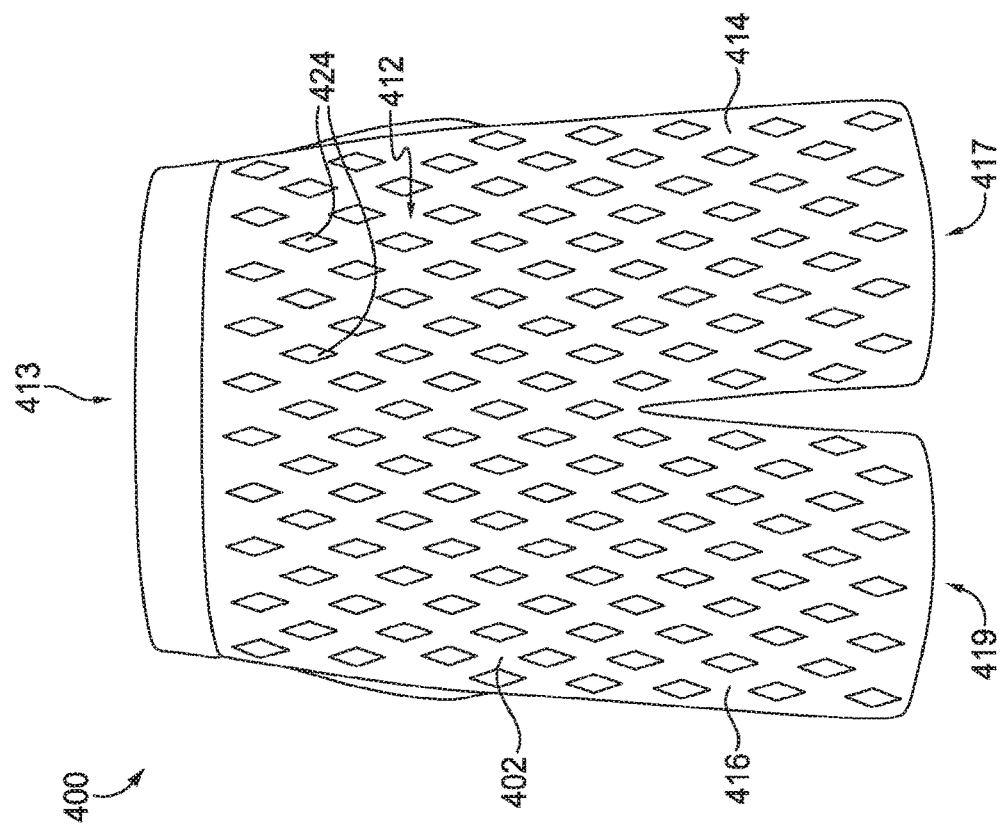
FIGS. 4A-4B illustrate a front view and a back view respectively of an inner-facing surface of an example lower-body garment having a plurality of discrete overlay film structures before the lower-body garment is exposed to an external stimulus in accordance with aspects herein.
Figure 4B:
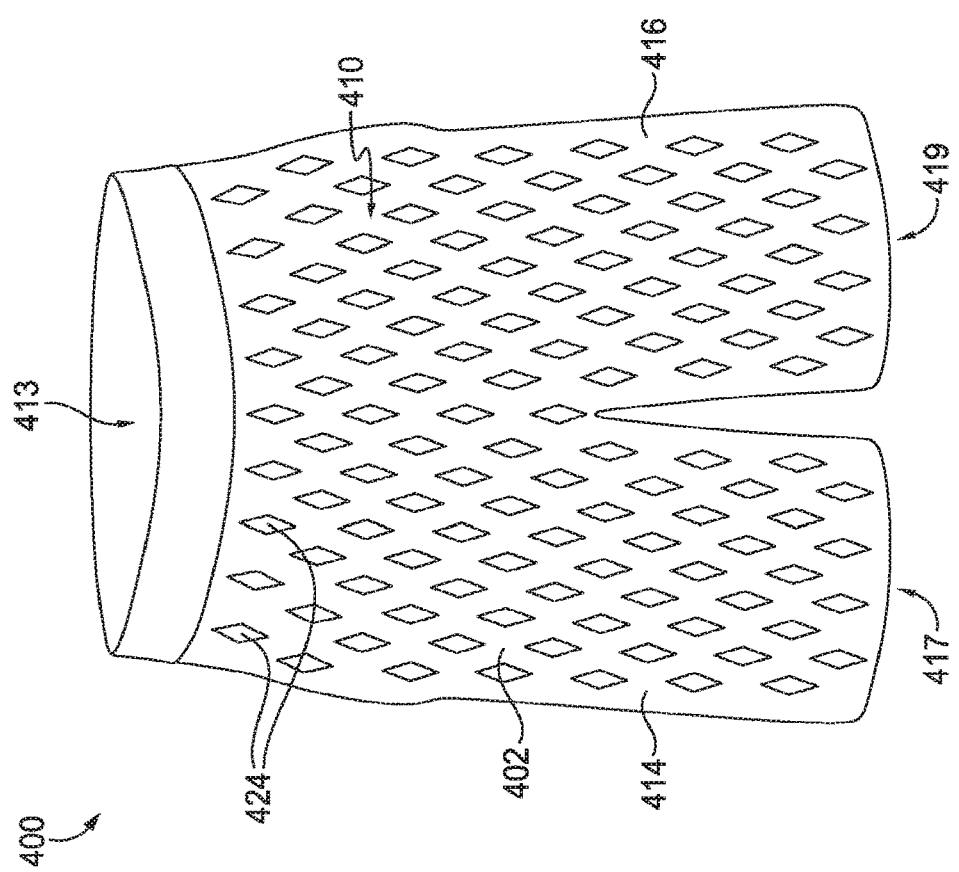

The film structures may also be used on a lower-body garment as shown in FIGS. 4A-4D. FIGS. 4A and 4B depict front and back views respectively of an inner-facing surface of a lower-body garment 400 before the lower-body garment 400 is exposed to an external stimulus. The lower-body garment 400 is formed from a base textile 402 and includes a front torso area 410 (shown in FIG. 4A) and a back torso area 412 (shown in FIG. 4B) that define a waist opening 413. The lower-body garment 400 also includes a first leg portion 414 having a first leg opening 417, and a second leg portion 416 having a second leg opening 419. Although shown as a short, it is contemplated herein that the lower-body garment 400 may be in the form of a pant, a legging, a capri, and the like.

The lower-body garment 400 is depicted as including a plurality of discrete overlay film structures 424 extending uniformly across the front torso area 410, the back torso area 412, the first leg portion 414, and the second leg portion 416. The overlay film structures 424 are depicted as being affixed to the inner-facing surface of the lower-body garment 400. It is contemplated herein that the overlay film structures 424 may additionally or alternatively be positioned on an outer-facing surface of the lower-body garment 400. In example aspects, it is contemplated herein that the overlay film structures 424 cover from about 20% to about 70% of the surface area of the lower-body garment 400, from about 30% to about 60% of the surface area of the lower-body garment 400, or from about 35% to 40% of the surface area of the lower-body garment 400. Coverage in these ranges provides for an adequate amount of stand-off to achieve a measurable reduction in cling while still maintaining characteristics of the base textile 402 such as breathability, permeability, moisture-wicking, hand, and the like. As explained further below, it is also contemplated herein that the film structures 424 may be zonally located on the lower-body garment 400. The number, size, orientation, and shape of the film structures 424 are illustrative, and other sizes, orientations, shapes and number of the film structures 424 are contemplated herein.

As shown in FIGS. 4A and 4B, in example aspects, the lower-body garment 400 may not be closely adherent to the wearer's torso and/or legs to provide a looser fit. This may be desirable in some situations, but in other situations, the wearer may desire a closer fit in this area to, for instance, reduce drag.

FIGS. 4C and 4D depict front and back views respectively of the lower-body garment 400 after the garment 400 has been exposed to a stimulus such as sweat. The exposure of the film structures 424 to the stimulus causes the film structures 424 to expand for instance, at least in a z-direction and/or in the x-direction and the y-direction, and to fold or bend at least along their midline axes. The folding or bending of the film structures 424 along their midline axes causes the base textile 402 to pucker or move in the z-direction in areas of the base textile 402 that underlie the film structures 424 creating stand-off nodes 420. Since the overlay film structures 424 are positioned on an inner-facing surface of the lower-body garment 400, the stand-off nodes 420 extend toward a body surface of a wearer helping to lift the lower-body garment 400 off of the wearer's skin surface to reduce cling and create a space between the inner-facing surface of the lower-body garment 400 and the wearer's skin surface through which air can circulate and aid in the evaporation of sweat. An illustrative example of this is shown in, for instance, FIG. 3E.

Further, in example aspects, due to the film structures 424 being applied circumferentially around the torso portion and leg portions of the lower-body garment 400, the cumulative puckering of the base textile 402 may cause the circumference of the torso portion and/or the waist opening 413 to decrease. For instance, after exposure to the external stimulus, the waist opening 413 may have a circumference less than the circumference of the waist opening 413 prior to the lower-body garment 400 being exposed to the stimulus. As well, the circumference of the first and second leg portions 414 and 416 and their respective first and second leg openings 417 and 419 may decrease after the lower-body garment 400 is exposed to an external stimulus. The decrease in circumference of the torso portion and/or the leg portions 414 and 416 may create a tighter, more aerodynamic fit of the upper-body garment 300. When the lower-body garment 400 is no longer exposed to the external stimulus, the film structures 424 transition back to a flattened or planar state, the deformation of the base textile 402 relaxes, and the stand-off nodes 420 disappear.

Figure 5:
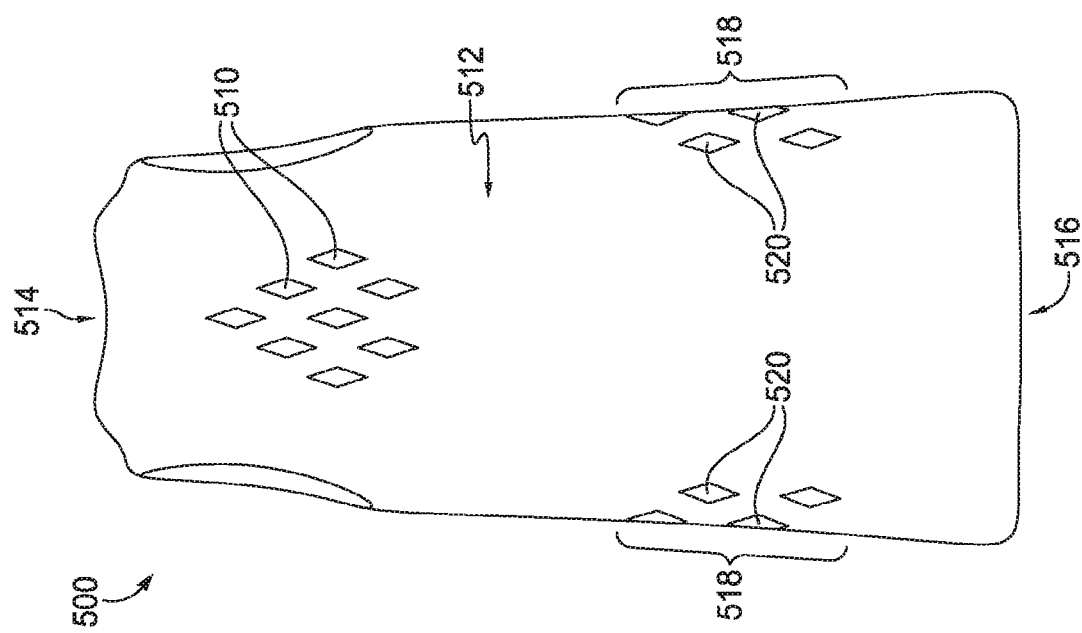
FIG. 5 illustrates an example upper-body garment having a plurality of discrete overlay film structures affixed to an inner-facing surface of the upper-body garment in areas corresponding to high sweat production areas of a human torso when the upper-body garment is in an as-worn configuration in accordance with aspects herein.

FIG. 5 depicts a back view of an inner-facing surface of an upper-body garment 500 having a zonal placement of a plurality of overlay film structures. The upper-body garment 500 is shown as a sleeveless top having a torso portion 512 that defines a neck opening 514 and a waist opening 516, and a pair of side areas 518 although other configurations are contemplated herein. In example aspects, the film structures may be affixed to the upper-body garment 500 in areas corresponding to high sweat production regions of a human wearer as based on, for instance, sweat maps. Thus, in example aspects, the upper-body garment 500 may include a first plurality of overlay film structures 510 positioned at a central back area of the torso portion 512. The upper-body garment 500 may further include a second plurality of overlay film structures 520 positioned at the pair of side areas 518 of the upper-body garment 500 (i.e., the flank areas). The film structures may be positioned at other locations on the upper-body garment 500 such as shoulder areas and/or a central front area of the torso portion 512 as these areas on a wearer are also known to produce relatively high amounts of sweat. When the upper-body garment 500 is exposed to a stimulus such as sweat, stand-off nodes are formed at the areas of the garment 500 having the first and second pluralities of film structures 510 and 520 helping to reduce cling and increase air circulation.

Figure 6:
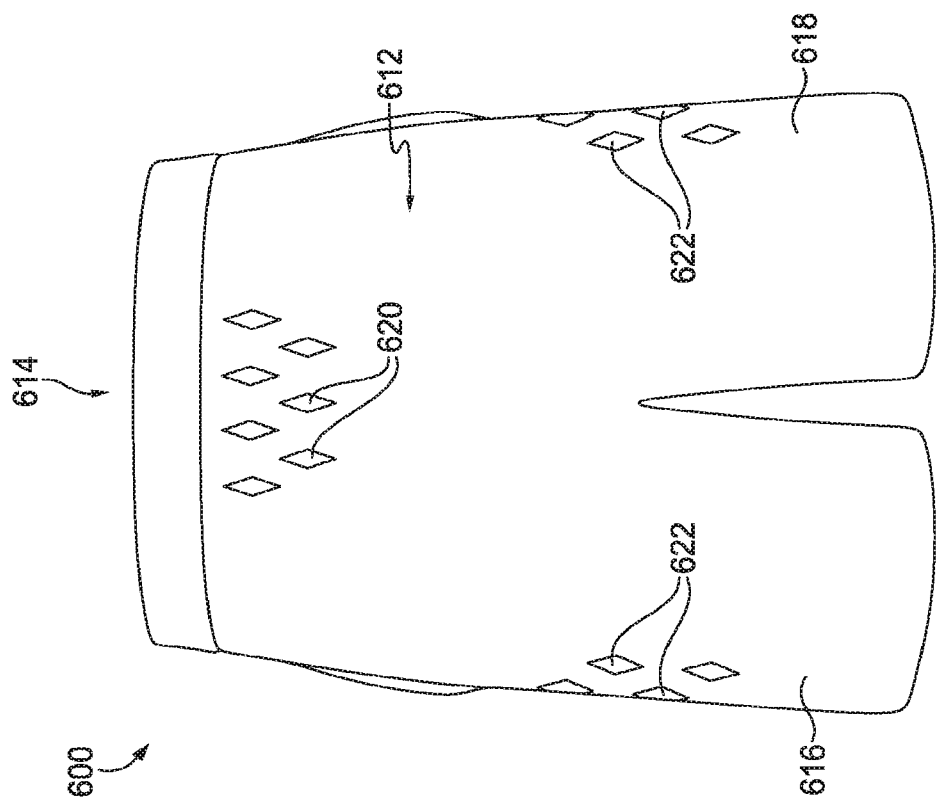
FIG. 6 illustrates an example lower-body garment having a plurality of discrete overlay film structures affixed to an inner-facing surface of the lower-body garment in areas corresponding to high sweat production areas of a human torso when the lower-body garment is in an as-worn configuration in accordance with aspects herein.

FIG. 6 illustrates a back view of an inner-facing surface of a lower-body garment 600 having a zonal placement of a plurality of film structures. The lower-body garment 600 is shown as a short having a torso portion 612 that defines a waist opening 614, a first leg portion 616 and a second leg portion 618 although other configurations are contemplated herein (e.g., a pant, a capri, and the like). Similar to the upper-body garment 500, film structures may be affixed to the lower-body garment 600 in areas corresponding to high sweat production regions of the human wearer as based on, for example, sweat maps. In example aspects, the lower-body garment 600 may include a first plurality of overlay film structures 620 positioned at a central back area of the torso portion 612. The lower-body garment 600 may also include additional film structures such as a second plurality of overlay film structures 622 positioned on the sides of the first and second leg portions 616 and 618 as these areas may cling to a wearer and cause distraction or discomfort. The film structures may be positioned at other locations on the lower-body garment 600 than those shown such as, for example, along an in-seam area of the lower-body garment 600 to reduce cling in this area. When the lower-body garment 600 is exposed to a stimulus such as sweat, stand-off nodes are formed at the areas of the garment 600 having the first and second pluralities of film structures 620 and 622 helping to reduce cling and increase air circulation.

Although not shown, aspects herein contemplate that the garment may be a long-sleeve shirt or a hooded jacket formed from a base textile as described herein (i.e., a lightweight knit or woven textile). In the long-sleeved shirt aspect, in addition to the locations already described, the overlay film structures may be located in an underarm area of the shirt. In the hooded jacket aspect, in addition to the locations already described, the overlay film structures may be located in the hood of the jacket.

The diamond shape depicted for the film structures is just one example of different shape configurations for the film structures. FIGS. 7A-7C depict example alternative shapes for the film structures. FIG. 7A depicts a base textile 705 having film structures 710 with a circular shape. FIG. 7B depicts a base textile 715 having film structures 720 with an ellipsoid shape. FIG. 7C depicts a base textile 725 having film structures 730 with a quadrilateral shape having two pairs of equal length sides that are adjacent to each other. Additional shapes for the film structures are contemplated herein including asymmetric shapes such as crescents, organic shapes, half-circle shapes, alphanumeric shapes, and the like. As well, it is contemplated herein that the base textile may include a number of different shaped film structures and/or film structures with different sizes and/or surface areas. Any and all aspects, and any variation thereof, are contemplated as being within aspects herein.

The film structures that are applied to a base textile may have different thicknesses. FIG. 8A depicts a base textile 805 before the base textile 805 is exposed to an external stimulus, The base textile 805 includes a first film structure 810 with a first thickness 815 and a second film structure 820 with a second thickness 825 that is less than the first thickness 815 of the first film structure 810. FIG. 8B illustrates the base textile 805 after being exposed to an external stimulus, such as moisture. The first film structure 810 increases in dimension in at least the z-direction to thickness 830, and the second film structure 820 increases in dimension in at least the z-direction to thickness 835, where the thickness 835 is less than the thickness 830. Because the first film structure 810 is thicker than the second film structure 820, it may cause a greater amount of stand-off. For example, a combined height 840 of the first film structure 810 and the base textile 805 as measured between a second surface plane 831 and an apex of the first film structure 810 may be greater than a combined height 842 of the second film structure 820 and the base textile 805 as measured between the second surface plane 831 and an apex of the second film structure 820.

FIG. 9 depicts a flow diagram of an example method of manufacturing a garment and is referenced generally by the numeral 900. At a step 910, a plurality of discrete overlay film structures, such as the film structures 110 is applied to one or more of an inner-facing surface and an outer-facing surface of a base textile that forms the garment. The garment may be, for example, the upper-body garments 300 and 500 and the lower-body garments 400 and 600. In example aspects, the base textile may be a lightweight textile having a weight not exceeding about 150 gsm.

The plurality of discrete overlay film structures may, in example aspects, be applied to the base textile in areas corresponding to high sweat production regions of a human body when the garment is in an as-worn configuration. When the garment is exposed to, for example, moisture in the form of sweat, the plurality of discrete overlay film structures undergoes a change in dimension in a z-direction. Additionally, areas of the base textile underlying the plurality of discrete overlay film structures also undergo a change in dimension in the z-direction to produce stand-off nodes such those shown in FIGS. 3E and 3F. The stand-off nodes help to lift the garment off of a wearer's skin surface reducing the amount of cling and also creating a space through which air may circulate.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1. A garment comprising a base textile; and a plurality of discrete overlay film structures affixed to the base textile, wherein upon exposure to moisture the plurality of discrete overlay film structures undergoes a change in dimension in at least a z-direction, and wherein areas of the base textile underlying the plurality of discrete overlay film structures undergoes a change in dimension in the z-direction.

Clause 2. The garment according to clause 1, wherein the base textile comprises a knit construction having a weight not exceeding about 150 grams/meter$^2$ (gsm).

Clause 3. The garment according to clause 1, wherein the base textile comprises a woven construction having a weight not exceeding about 150 grams/meter$^2$ (gsm).

Clause 4. The garment according to any of clauses 1 through 3, wherein the plurality of discrete overlay film structures is affixed to an inner-facing surface of the garment.

Clause 5. The garment according to any of clauses 1 through 4, wherein the plurality of discrete overlay film structures is affixed to an outer-facing surface of the garment.

Clause 6. The garment according to any of clauses 1 through 5, wherein the garment is an upper-body garment.

Clause 7. The garment according to clause 6, wherein the plurality of discrete overlay film structures is affixed to a front torso area, a back torso area, and side areas of the upper-body garment.

Clause 8. The garment according to clause 7, wherein the upper-body garment comprises a sleeveless top.

Clause 9. The garment according to any of clauses 1 through 8, wherein the plurality of discrete overlay film structures comprises a thermoplastic polyester elastomer.

Clause 10. The garment according to clause 9, wherein each of the plurality of discrete overlay film structures has a thickness not exceeding about 50 microns.

Clause 11. The garment according to any of clauses 1 through 10, wherein the change in dimension in the z-direction is from about 0.8 cm to about 1.2 cm.

Clause 12. The garment according to any of clauses 1 through 11, wherein the plurality of discrete overlay film structures covers from about 20% to about 70% of a surface area of the garment.

Clause 13. A garment comprising: a base textile; and a plurality of discrete overlay film structures affixed to the base textile, wherein upon exposure to moisture the plurality of discrete overlay film structures undergoes a change in dimension in at least an x-, y-, or a z-direction, and wherein the plurality of discrete overlay film structures covers from about 20% to about 70% of a surface area of the garment.

Clause 14. The garment according to clause 13, wherein the base textile has a weight not exceeding about 150 grams/meter$^2$ (gsm).

Clause 15. The garment according to any of clauses 13 through 14, wherein the plurality of discrete overlay film structures is affixed to an inner-facing surface of the garment.

Clause 16. The garment according to any of clauses 13 through 15, wherein the plurality of discrete overlay film structures is affixed to an outer-facing surface of the garment.

Clause 17. The garment according to any of clauses 13 through 16, wherein the plurality of discrete overlay film structures comprises a thermoplastic polyester elastomer.

Clause 18. The garment according to clause 17, wherein each of the plurality of discrete overlay film structures has a thickness not exceeding about 50 microns.

Clause 19. The garment according to any of clauses 13 through 18, wherein the change in dimension is in at least the z-direction and is from about 0.8 cm to about 1.2 cm.

Clause 20. A method of manufacturing a garment comprising: affixing a plurality of discrete overlay film structures to one or more of an inner-facing surface and an outer-facing surface of a base textile that forms the garment, the plurality of discrete overlay film structures affixed to the base textile in areas corresponding to high sweat production regions of a human body when the garment is in an as-worn configuration, wherein: the base textile has a weight not exceeding about 150 grams/meter$^2$ (gsm), and upon exposure to moisture the plurality of discrete overlay film structures undergoes a change in dimension in a z-direction and areas of the base textile underlying the plurality of discrete overlay film structures undergoes a change in dimension in the z-direction.

Clause 21. A lower-body garment comprising a base textile; and a plurality of discrete overlay film structures affixed to the base textile, wherein upon exposure to moisture the plurality of discrete overlay film structures undergoes a change in dimension in at least a z-direction, and wherein areas of the base textile underlying the plurality of discrete overlay film structures undergo a change in dimension in the z-direction.

Clause 22. The lower-body garment according to clause 21, wherein the base textile comprises a knit construction having a weight not exceeding about 150 grams/meter$^2$ (gsm).

Clause 23. The lower-body garment according to clause 21, wherein the base textile comprises a woven construction having a weight not exceeding about 150 grams/meter$^2$ (gsm).

Clause 24. The lower-body garment according to any of clauses 21 through 23, wherein the plurality of discrete overlay film structures is affixed to an inner-facing surface of the lower-body garment.

Clause 25. The lower-body garment according to any of clauses 21 through 24, wherein the plurality of discrete overlay film structures is affixed to an outer-facing surface of the lower-body garment.

Clause 26. The lower-body garment according to any of clauses 21 through 25, wherein the plurality of discrete overlay film structures is affixed to a front torso area, a back torso area, a first leg portion and a second leg portion of the lower-body garment.

Clause 27. The lower-body garment according to any of clauses 21 through 25, wherein the plurality of discrete overlay film structures is affixed to just a back torso area of the lower-body garment.

Clause 28. The lower-body garment according to any of clauses 21 through 27, wherein the lower-body garment comprises a short.

Clause 29. The lower-body garment according to any of clauses 21 through 28, wherein the plurality of discrete overlay film structures comprises a thermoplastic polyester elastomer.

Clause 30. The lower-body garment according to clause 29, wherein each of the plurality of discrete overlay film structures has a thickness not exceeding about 50 microns.

Clause 31. The lower-body garment according to any of clauses 21 through 30, wherein the change in dimension in the z-direction is from about 0.8 cm to about 1.2 cm.

Clause 32. The lower-body garment according to any of clauses 21 through 31, wherein the plurality of discrete overlay film structures covers from about 20% to about 70% of a surface area of the lower-body garment.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A garment comprising:
   a base textile; and
   a plurality of discrete overlay film structures comprising a thermoplastic polymer affixed to the base textile, wherein upon exposure to moisture the plurality of discrete overlay film structures undergoes a change in dimension in at least a z-direction, and wherein areas of the base textile underlying the plurality of discrete overlay film structures undergo a change in dimension in the z-direction; and
   wherein the plurality of discrete overlay film structures comprises a gradient pattern with a greater concentration of the overlay film structures in a first location of the base textile compared to a second location of the base textile, and the plurality of discrete overlay film structures comprise a thermoplastic polyester elastomer that has a water vapor transmission rate from about 600 g/m$^2$/day to about 10,000 g/m$^2$/day.

2. The garment of claim 1, wherein the base textile comprises a knit construction having a weight not exceeding about 150 grams/meter$^2$ (gsm).

3. The garment of claim 1, wherein the base textile comprises a woven construction having a weight not exceeding about 150 grams/meter$^2$ (gsm).

4. The garment of claim 1, wherein the plurality of discrete overlay film structures is affixed to an inner-facing surface of the garment.

5. The garment of claim 1, wherein the plurality of discrete overlay film structures is affixed to an outer-facing surface of the garment.

6. The garment of claim 1, wherein the garment is an upper-body garment.

7. The garment of claim 6, wherein the plurality of discrete overlay film structures is affixed to a front torso area, a back torso area, and side areas of the upper-body garment.

8. The garment of claim 7, wherein the upper-body garment comprises a sleeveless top.

9. The garment of claim 1, wherein each of the plurality of discrete overlay film structures has a thickness not exceeding about 50 microns.

10. The garment of claim 1, wherein the change in dimension in the z-direction is from about 0.8 cm to about 1.2 cm.

11. The garment of claim 1, wherein the plurality of discrete overlay film structures covers from about 20% to about 70% of a surface area of the garment.

12. A garment comprising:
    a base textile; and
    a plurality of discrete overlay film structures comprising a thermoplastic polymer affixed to the base textile, wherein upon exposure to moisture the plurality of discrete overlay film structures undergoes a change in dimension in at least an x-, y-, or a z-direction, and wherein the plurality of discrete overlay film structures comprise a thermoplastic polyester elastomer that has a water vapor transmission rate from about 600 g/m$^2$/day to about 10,000 g/m$^2$/day.

13. The garment of claim 12, wherein the base textile has a weight not exceeding about 150 grams/meter$^2$ (gsm).

14. The garment of claim 12, wherein the plurality of discrete overlay film structures is affixed to an inner-facing surface of the garment.

15. The garment of claim 12, wherein the plurality of discrete overlay film structures is affixed to an outer-facing surface of the garment.

16. The garment of claim 12, wherein each of the plurality of discrete overlay film structures has a thickness not exceeding about 50 microns.

17. The garment of claim 12, wherein the change in dimension is in at least the z-direction and is from about 0.8 cm to about 1.2 cm.

18. A method of manufacturing a garment comprising:
    affixing a plurality of discrete overlay film structures comprising a thermoplastic polymer to one or more of an inner-facing surface and an outer-facing surface of a base textile that forms the garment, the plurality of discrete overlay film structures affixed to the base textile in areas corresponding to high sweat production regions of a human body when the garment is in an as-worn configuration, wherein:
    the base textile has a weight not exceeding about 150 grams/meter$^2$ (gsm),
    upon exposure to moisture the plurality of discrete overlay film structures undergoes a change in dimension in a z-direction and areas of the base textile underlying the plurality of discrete overlay film structures undergo a change in dimension in the z-direction, and
    the plurality of discrete overlay film structures is applied in a gradient pattern with a greater concentration of the overlay film structures in a first location of the base textile compared to a second location of the base textile; and
    the plurality of discrete overlay film structures comprise a thermoplastic polyester elastomer that has a water vapor transmission rate from about 600 g/m$^2$/day to about 10,000 g/m$^2$/day.

19. The garment of claim 1, wherein the thermoplastic polyester elastomer has a water vapor transmission rate from about 1,000 g/m$^2$/day to about 9,000 g/m$^2$/day.

20. The garment of claim 19, wherein the thermoplastic polyester elastomer has a water vapor transmission rate from about 3,000 g/m$^2$/day to about 8,000 g/m$^2$/day.

21. The garment of claim 20, wherein the thermoplastic polyester elastomer has a water vapor transmission rate from about 5,000 g/m$^2$/day to about 7,000 g/m$^2$/day.

22. The garment of claim 21, wherein the thermoplastic polyester elastomer has a water vapor transmission rate of about 6,000 g/m$^2$/day.

* * * * *